United States Patent [19]
Sakata et al.

[11] Patent Number: 5,804,865
[45] Date of Patent: Sep. 8, 1998

[54] PACKAGE FOR OPTICAL SEMICONDUCTOR ELEMENT AND METHOD FOR MANUFACTURING THE SAME

[75] Inventors: Masato Sakata, Utsunomiya; Yukio Kazama; Kazuto Ono, both of Nikko; Hideaki Murata, Sagamihara, all of Japan

[73] Assignee: The Furukawa Electric Co., Ltd., Tokyo, Japan

[21] Appl. No.: 861,863

[22] Filed: May 22, 1997

[30] Foreign Application Priority Data

May 28, 1996 [JP] Japan ................................ 8-133352
Feb. 25, 1997 [JP] Japan ................................ 9-040619

[51] Int. Cl.⁶ .......................................... H01L 31/0203
[52] U.S. Cl. ................................. 257/433; 257/432
[58] Field of Search ........................ 257/433, 432, 257/680; 438/125, 116

[56] References Cited

U.S. PATENT DOCUMENTS

| | | |
|---|---|---|
| 4,834,491 | 5/1989 | Aoki et al. . |
| 5,011,256 | 4/1991 | Johnson et al. . |
| 5,047,835 | 9/1991 | Chang . |
| 5,127,075 | 6/1992 | Althaus et al. . |
| 5,132,532 | 7/1992 | Watanabe . |

*Primary Examiner*—Mahshid D. Saadat
*Assistant Examiner*—S. V. Clark
*Attorney, Agent, or Firm*—Frishauf, Holtz, Goodman, Langer & Chick

[57] ABSTRACT

A package for optical semiconductor device comprising a metallic frame having a side wall provided with an optical fiber-securing portion for securing an optical fiber to be introduced through the side wall, and a metallic bottom plate for mounting the optical semiconductor device thereon. The metallic frame is provided at a lower portion of the side wall thereof with securing parts for securing the package to a substrate, each securing part outwardly extending in a direction parallel with the metallic bottom plate. The level of bottom face of the metallic bottom plate is made lower than that of the bottom face of the securing parts. The securing parts are integrally formed with the metallic frame.

12 Claims, 3 Drawing Sheets

PACKAGE FOR OPTICAL SEMICONDUCTOR ELEMENT AND METHOD FOR MANUFACTURING THE SAME

BACKGROUND OF THE INVENTION

This invention relates to a package for optical semiconductor device, and also to a method of manufacturing the package.

A package for housing an optical semiconductor device is generally composed of a metallic bottom plate for mounting an optical semiconductor device such as a semiconductor laser device, and a metallic frame provided with a member for fastening an optical fiber and with an electric signal-input terminal member such as a ceramic terminal. FIGS. 1A and 1B illustrate one example of the conventional package for optical semiconductor device.

Namely, this conventional package for optical semiconductor device is composed of a metallic frame 1 constructed as shown in FIG. 1A and a rectangular metallic bottom plate 2 constructed as shown in FIG. 1B, the metallic bottom plate 2 being adapted to be fixed to the bottom of the metallic frame 1. The opposed both end portions of this metallic bottom plate 2 are provided with fixing holes 4, through which the package can be attached to an external member such as a substrate. The main portion of the metallic bottom plate 2 is designed to mount thereon an optical semiconductor device such as a semiconductor laser device. One side portion of the metallic frame 1 is provided with a window frame 3 through which an optical fiber can be attached and also with the other side portion 5 through which any required ceramic terminals for input/output electric signals can be attached. The open top portion of the metallic frame 1 is adapted to be covered by a metallic cap (not shown) for hermetically sealing the package.

The metallic frame 1 should desirably have a thermal expansion coefficient which is close to that of the ceramic terminals, and hence the material for the metallic frame 1 is generally selected from an iron-nickel alloy and an iron-nickel-cobalt alloy. On the other hand, the material for the metallic bottom plate 2 is generally selected from copper and a copper-tungsten alloy, since any heat generating from a semiconductor laser device is required to be promptly dissipated outside. The attachment between the metallic frame 1 and the metallic bottom plate 2 is generally performed using a brazing material.

The package for optical semiconductor device composed of the metallic frame 1 and the rectangular metallic bottom plate 2 as illustrated above can be attached to an external member by means of screws through the fixing holes 4 which have been formed in both end portions of the metallic bottom plate 2.

However, in the case of the package for optical semiconductor device where a metallic material employed for the metallic frame is different in kind from that employed for the bottom plate, a strain is caused to generate in the assembling step of the package by making use of brazing due to a difference in thermal expansion coefficient between the metallic frame and the bottom plate, whereby generating a warpage in the metallic bottom plate.

When this package for optical semiconductor device where a warpage is generated in the metallic bottom plate is put to use, i.e. when an optical fiber is attached to the metallic frame, a semiconductor laser device is mounted on the metallic bottom plate and then the package is secured to an external member by means of screws through the fixing holes which have been formed in both end portions of the metallic bottom plate, the tightening force of the screws is transmitted to the entire body of the bottom plate to cause the bottom plate to be deformed and warped. As a result to this warpage in the bottom plate, the mounted position of the semiconductor laser device is caused to be dislocated, thus giving rise to a problem that a misregister in optical axis is generated between the semiconductor laser device and the optical fiber. This misregister in optical axis will result in a deterioration of the optical coupling efficiency between the semiconductor laser device and the optical fiber.

BRIEF SUMMARY OF THE INVENTION

An object of the present invention is to provide a package for optical semiconductor device, which is free from any deformation of a metallic bottom plate when the package is mounted on an external member, and therefore free from the generation of misregister in optical axis between the semiconductor laser device and the optical fiber.

Another object of the present invention is to provide a method for manufacturing such a package for optical semiconductor device having the features as mentioned above.

According to the present invention, there is provided a package for optical semiconductor device comprising a metallic frame having a side wall provided with an optical fiber-securing portion for securing an optical fiber to be introduced through the side wall, and a metallic bottom plate attached to an open bottom of the metallic frame for mounting the optical semiconductor device thereon, the package being featured in that the metallic frame is provided at a lower portion of the side wall with securing members for securing the package to an external member, each securing member outwardly extending in a direction parallel with the metallic bottom plate.

According to the present invention, there is further provided a method of manufacturing a package for optical semiconductor device, which comprises the steps of; fixing a metallic bottom plate for mounting the optical semiconductor device to an open bottom portion of a metallic frame having a side wall provided with an optical fiber-securing portion for securing an optical fiber to be introduced through the side wall and also with, at a lower portion thereof, securing members for securing the package to an external member, each securing member outwardly extending in a direction parallel with the metallic bottom plate; and performing a bending of the securing members.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE INVENTION

Figure 1A:
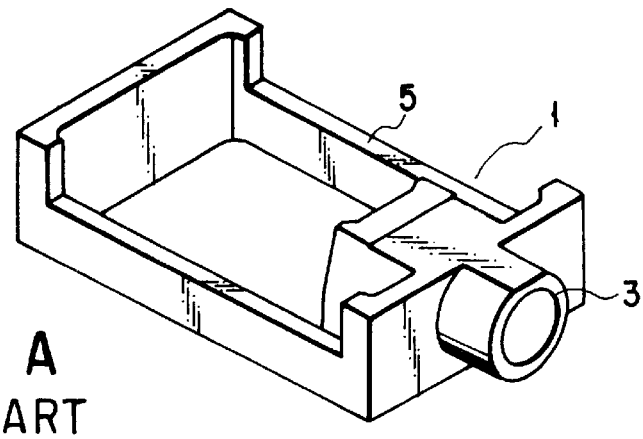
FIGS. 1A and 1B are perspective views collectively showing a disintegrated state of a conventional package for optical semiconductor device.
Figure 1B:
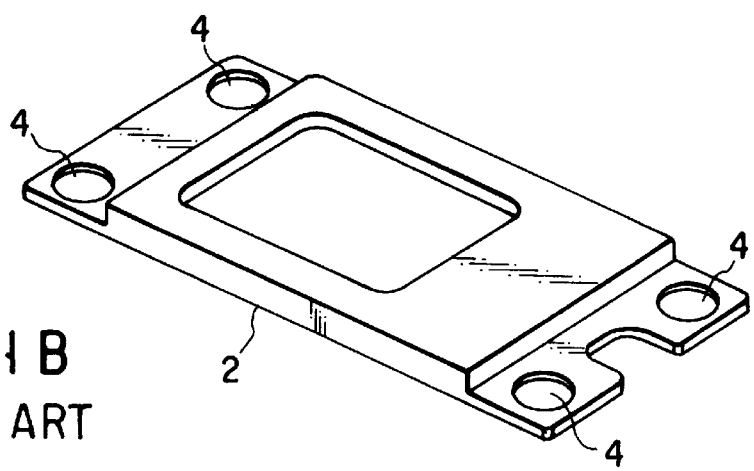

The package for optical semiconductor device according to this invention is featured in that securing members each having a fixing hole for securing the package to an external member are integrally formed at lower portion of the outer side wall of a metallic frame. If the package for optical semiconductor device constructed in this manner is secured, through the securing members of the metallic frame, to an external member, any stress to be transmitted to the entire body of the metallic bottom plate can be minimized as compared with the conventional case where the package is secured to an external member by making use of the fixing holes formed on the metallic bottom plate (i.e. by inserting screws into the fixing holes and thus fastening the metallic bottom plate to the external member using the screws). As a result, the dislocation of the semiconductor laser device mounted on the metallic bottom plate can be suppressed, and therefore any misregister in optical axis to be generated between the semiconductor laser device and the optical fiber can be minimized. Therefore, any deterioration of the optical coupling efficiency between the semiconductor laser device and the optical fiber can be also minimized.

If the level of the bottom face of the metallic bottom plate is made lower than the bottom faces of the securing members of the metallic frame, the bottom face of the metallic bottom plate would be directly contacted with the surface of an external member as the package is secured by way of the securing members to the external member. As a result, any heat generated from the optical semiconductor device can be effectively transmitted from the metallic bottom plate to the external member, thus improving the heat dissipation from the optical semiconductor device mounted on the metallic bottom plate.

Moreover, according to the method for manufacturing a package for optical semiconductor device of this invention, the metallic bottom plate is fixed to the metallic frame at first, and then the protruded portions extending from the lower portion of the outer side wall of the metallic frame to a direction parallel with the metallic bottom plate is subjected to a bending (or bend-working) so as to form the securing members. As a result, it becomes easy to make the bottom face of the securing member parallel with the bottom face of the metallic bottom plate, and at the same time to control the locational adjustment between these bottom faces.

By the way, if the securing members are formed integral with the metallic frame by means of a metallic injection molding as commonly adopted, the securing members are most likely to be deformed due to a subsequent sintering treatment or heat-treatment for removing binders. If this deformation is to be corrected, another mechanical working may be required. However, since such a mechanical working is performed before the brazing step, the locational adjustment as effected by the above-mentioned bending cannot be achieved. Furthermore, if the locational adjustment of the securing members is to be performed by the mechanical working with a high accuracy, i.e. the height of the securing members in relative to the bottom plate being controlled within the range of 0 to 0.7 mm, the cost for obtaining such a high accuracy may become higher than that required in the aforementioned bend-working.

This invention will be further explained with reference to the drawings showing preferred embodiments of this invention.

Figure 2:
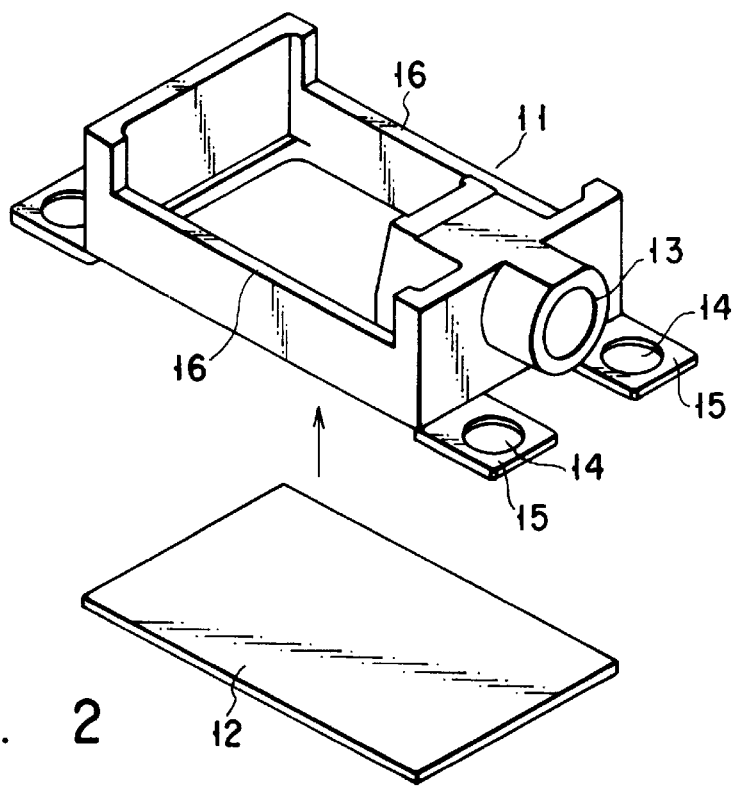
FIG. 2 is a perspective view showing a disintegrated state of a package for an optical semiconductor device according to one example of this invention.
Figure 3:
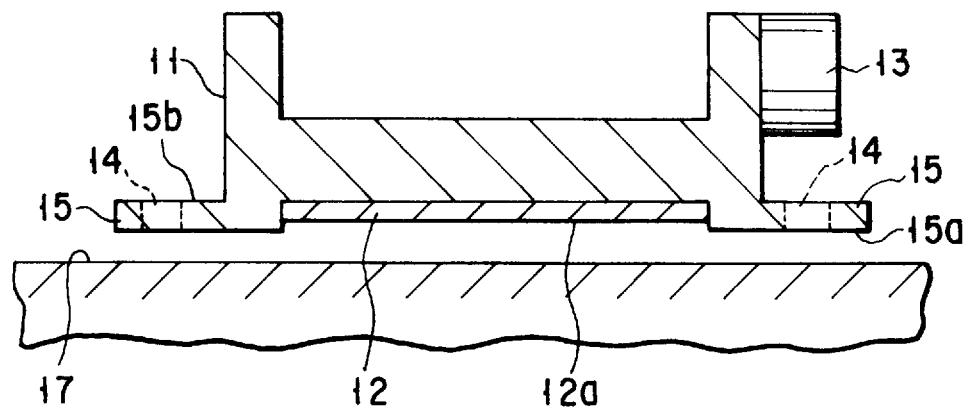
FIG. 3 is a longitudinal sectional view showing the package for the optical semiconductor device shown in FIG. 2.

FIG. 2 shows a perspective view of a disintegrated state of a package for optical semiconductor device according to one example of this invention; and FIG. 3 shows a longitudinal sectional view of an assembled state of the optical semiconductor device. In these FIGS., reference numeral 11 represents a metallic frame; 12, a metallic bottom plate; 13, a window frame for securing an optical fiber; 14, a fixing hole; and 15, an securing member.

The metallic frame 11 and securing member 15 are both made of an iron-nickel-cobalt alloy (elastic modulus: 14,000 kgf/mm$^2$). The metallic bottom plate 12 is made of a copper-tungsten alloy (elastic modulus: 34,000 kgf/mm$^2$). The metallic frame 11 and metallic bottom plate 12 are bonded together by making use of a silver solder.

The window frame 13 is positioned at the front side of the metallic frame 11, and adapted to receive an optical fiber therein. The metallic frame 11 is provided with side portions 16 through which any terminals for input/output electric signals can be introduced. An optical semiconductor device is mounted via a Peltier device on the upper surface of the metallic bottom plate 12 which has been placed in advance within the metallic frame 11.

The securing members 15 are integrally formed with the metallic frame 11 by means of a metallic injection molding in such a manner that the securing members 15 are outwardly extended from the bottom portion of the metallic frame 11 to a direction approximately parallel with the bottom face of the metallic bottom plate 12. Each of these securing members 15 is provided with a fixing hole 14, through which the package for optical semiconductor device can be secured to an external member 17 by making use of a screw as shown in FIG. 3.

It may be preferable to allow the securing members 15 to be elastically deformed at the proximal portion 15b thereof at the occasion of fixing the securing members 15 to the external member 17 by means of screws, whereby minimizing the deformation of the metallic bottom plate 12.

For this purpose, the metallic bottom plate 12 is arranged such that the bottom face 12a thereof becomes higher in level than the bottom faces 15a of the securing members 15 as shown in FIG. 3. The plate thickness and width of the securing members 15 should preferably be designed such that the proximal portion 15b of the securing members 15 is strong enough to withstand against fracture at the occasion of securing the package to the external member 17 and at the same time is not so rigid that the proximal portion 15b of the securing members 15 can be elastically deformed before any deformation of the metallic bottom plate 12 could occur.

Examples of design value of these components are; the metallic bottom plate 12 being 0.7 mm in plate thickness, and each of the securing members 15 being 0.5 mm in sheet thickness, 3.5 mm in width and 4.6 mm in length.

Figure 4:
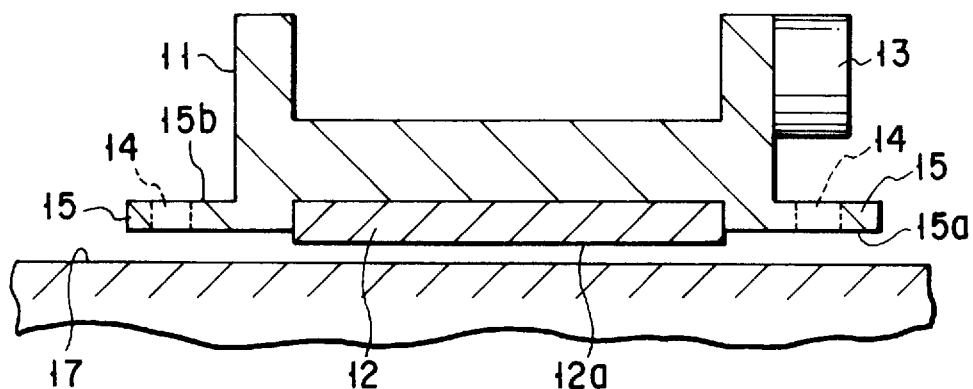
FIG. 4 is a longitudinal sectional view showing a package for an optical semiconductor device according to another example of this invention.

FIG. 4 shows a longitudinal sectional view of the optical semiconductor device according to another example of this invention. In this embodiment, the metallic bottom plate 12 is arranged such that the bottom face 12a thereof becomes lower in level than the bottom faces 15a of the securing members 15.

When the package is constructed in this manner, the bottom face 12a of the metallic bottom plate 12 would be entirely contacted with the surface of an external member 17 as the package is secured with screws by making use of the securing members 15 to the external member 17, so that the heat dissipation from the metallic bottom plate 12 can be further improved.

In this case, the thickness of that lower portion of the metallic bottom plate 12 which is downwardly protruded from the bottom faces 15a of the securing members 15 should preferably be controlled within the range of 0 to 0.1 mm, more preferably 0 to 0.05 mm. In this case also, the securing members 15 is designed such that the proximal portion 15b thereof can be elastically or plastically deformed at the occasion of fixing the securing members 15 to the external member 17, whereby minimizing the deformation of the metallic bottom plate 12.

Figure 5A:
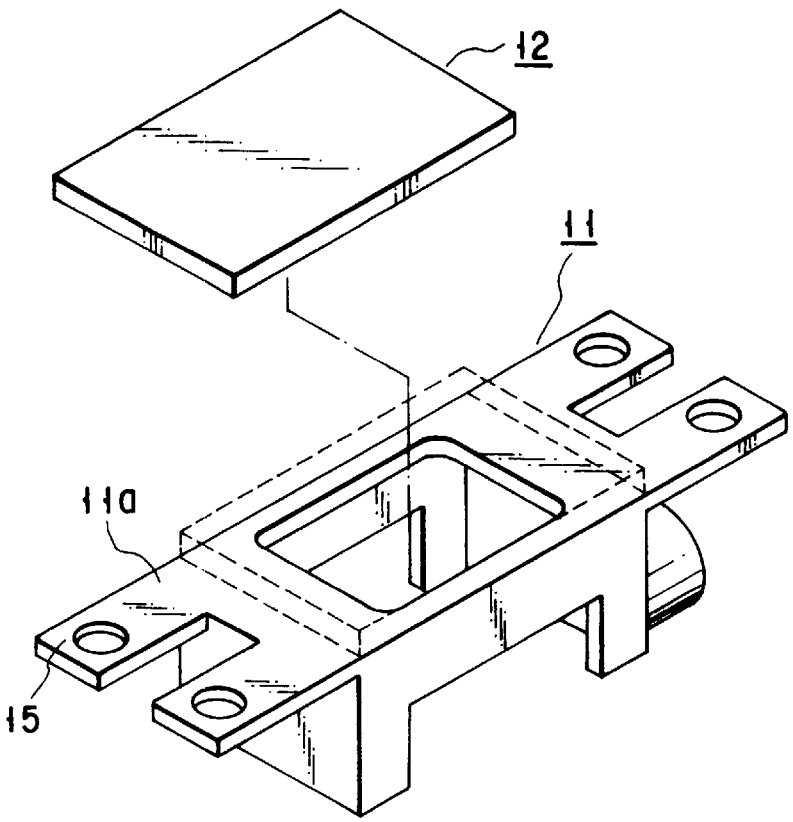
FIG. 5A is a disintegrated perspective view illustrating a step of manufacturing a package for an optical semiconductor device according to another example of this invention.
Figure 5B:
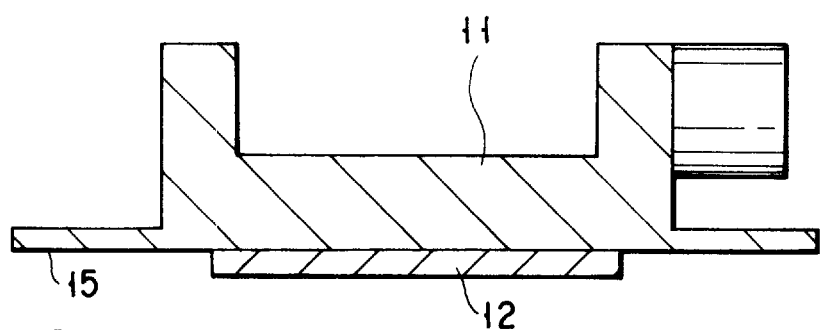
FIGS. 5B and 5C are longitudinal sectional views for illustrating the manufacturing steps of the package for the optical semiconductor device shown in FIG. 5A.
Figure 5C:
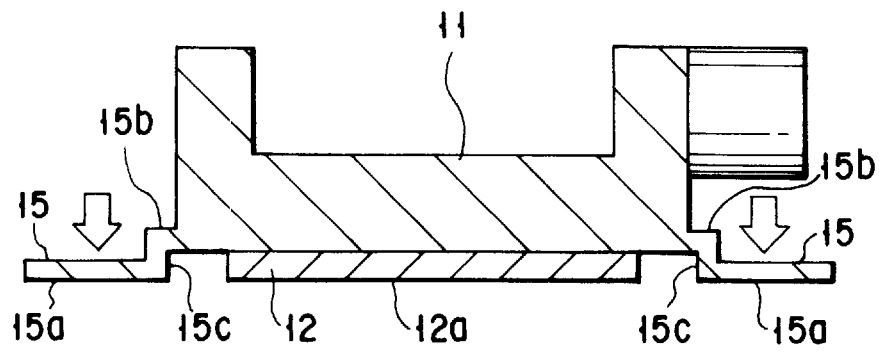

FIGS. 5A to 5C illustrate the sequence of manufacturing steps of the package for optical semiconductor device according to still another examples of this invention, as explained below.

Step (1)

First of all, the metallic frame 11 is manufactured in such a manner that the bottom face 11a (including the portions of the securing members 15) of the metallic frame 11 becomes flat. Then, the metallic bottom plate 12 is attached to the bottom face 11a of the metallic frame 11 by making use of brazing using an Ag solder (FIG. 5A). FIG. 5B illustrates a side view of the metallic frame 11 to which the metallic bottom plate 12 is attached by means of brazing using an Ag solder.

Step (2)

Then, as shown in FIG. 5C, the proximal portion 15b of the securing members 15 is subjected to a bending treatment to form a stepped portion 15c thereby making the bottom face 15a of the securing members 15 flush with the bottom face 12a (or basic level) of the metallic bottom plate 12. The locational adjustment (or matching of level) of the bottom face 15a of the securing members 15 to the bottom face 12a of the metallic bottom plate 12 can be easily performed by making use of this bending treatment.

The above examples are merely some of embodiments of this invention and therefore should not be construed as limiting the scope of this invention.

As explained above, according to the package for optical semiconductor device of this invention, since the securing members each having a fixing hole for securing the package to an external member are integrally formed at lower portion of the outer side wall of a metallic frame, any stress to be transmitted to the entire body of the metallic bottom plate can be minimized at the occasion of securing the package to an external member as compared with the conventional package wherein the package is secured to an external member by making use of the fixing holes formed on the metallic bottom plate (i.e. by inserting screws into the fixing holes and then fastening the metallic bottom plate with the screws). As a result, the dislocation of the semiconductor laser device mounted on the metallic bottom plate can be suppressed, and therefore any misregister in optical axis to be generated between the semiconductor laser device and the optical fiber can be minimized. Therefore, any deterioration of the optical coupling efficiency between the semiconductor laser device and the optical fiber can be also minimized.

Further, if the level of the bottom face of the metallic bottom plate is made lower than the bottom faces of the securing members of the metallic frame, the bottom face of the metallic bottom plate would be directly contacted with the surface of an external member as the package is secured by way of the securing members to the external member. As a result, any heat generated from the optical semiconductor device can be effectively transmitted from the metallic bottom plate to the external member, thus improving the heat dissipation from the optical semiconductor device mounted on the metallic bottom plate.

Moreover, according to the method for manufacturing a package for optical semiconductor device of this invention, the metallic bottom plate is fixed to the metallic frame at first, and then the protruded portions extending from the lower portion of the outer side wall of the metallic frame to a direction parallel with the metallic bottom plate is subjected to a bending treatment (or bend-working) so as to form the securing members. As a result, it becomes easy to make the bottom face of the securing member parallel with the bottom face of the metallic bottom plate, and at the same time to control the locational adjustment between these bottom faces.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A package for optical semiconductor device comprising a metallic frame having a side wall provided with an optical fiber-securing portion for securing an optical fiber to be introduced through the side wall, and a metallic bottom plate attached to an open bottom of said metallic frame for mounting the optical semiconductor device thereon, said package being featured in that said metallic frame is provided at a lower portion of said side wall with securing members for securing said package to an external member, each securing member outwardly extending in a direction parallel with said metallic bottom plate.

2. The package for optical semiconductor device according to claim 1, wherein the level of bottom face of said metallic bottom plate is lower than that of the bottom face of said securing members extending from said metallic frame.

3. The package for optical semiconductor device according to claim 1, wherein said securing members are integrally formed with said metallic frame.

4. The package for optical semiconductor device according to claim 1, wherein said securing members are respectively provided with a fixing hole.

5. The package for optical semiconductor device according to claim 1, wherein said metallic frame is formed of an iron-nickel-cobalt alloy, and said metallic bottom plate is formed of a copper-tungsten alloy.

6. The package for optical semiconductor device according to claim 1, wherein said metallic frame and said metallic bottom plate are bonded together by making use of a soldering.

7. A method of manufacturing a package for optical semiconductor device, which comprises the steps of;

fixing a metallic bottom plate for mounting the optical semiconductor device to an open bottom portion of a metallic frame having a side wall provided with an optical fiber-securing portion for securing an optical fiber to be introduced through the side wall and also with, at a lower portion thereof, securing members for securing said package to an external member, each securing member outwardly extending in a direction parallel with said metallic bottom plate; and performing a bending of said securing members.

8. The method of manufacturing a package for optical semiconductor device according to claim 7, wherein said bending of said securing members is performed such that the level of bottom face of said metallic bottom plate becomes lower than that of the bottom face of said securing members extending from said metallic frame.

9. The method of manufacturing a package for optical semiconductor device according to claim 7, wherein said securing members are integrally formed with said metallic frame.

10. The method of manufacturing a package for optical semiconductor device according to claim 7, wherein said securing members are respectively provided with a fixing hole.

11. The method of manufacturing a package for optical semiconductor device according to claim 7, wherein said metallic frame is formed of an iron-nickel-cobalt alloy, and said metallic bottom plate is formed of a copper-tungsten alloy.

12. The method of manufacturing a package for optical semiconductor device according to claim 7, wherein said metallic frame and said metallic bottom plate are bonded together by making use of a soldering.

* * * * *